United States Patent
Booij

(10) Patent No.: US 12,038,287 B2
(45) Date of Patent: *Jul. 16, 2024

(54) AUTOMATIC EGRESS/INGRESS DETECTION IN AN ACOUSTIC POSITIONING SYSTEM

(71) Applicant: Sonitor Technologies AS, Oslo (NO)

(72) Inventor: Wilfred Edwin Booij, Oslo (NO)

(73) Assignee: Sonitor Technologies AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,031

(22) Filed: Feb. 17, 2023

(65) Prior Publication Data

US 2023/0358543 A1 Nov. 9, 2023

Related U.S. Application Data

(63) Continuation of application No. 17/572,857, filed on Jan. 11, 2022, now Pat. No. 11,585,663, which is a continuation of application No. 16/587,577, filed on Sep. 30, 2019, now Pat. No. 11,221,222.

(51) Int. Cl.
| | |
|---|---|
| G01C 21/20 | (2006.01) |
| G01S 5/30 | (2006.01) |
| G01S 15/02 | (2006.01) |
| H04W 4/02 | (2018.01) |
| H04W 4/33 | (2018.01) |

(52) U.S. Cl.
CPC .............. *G01C 21/206* (2013.01); *G01S 5/30* (2013.01); *G01S 15/02* (2013.01); *H04W 4/023* (2013.01); *H04W 4/33* (2018.02)

(58) Field of Classification Search
CPC .......... G01C 21/206; G01S 5/30; G01S 15/02
See application file for complete search history.

(56) References Cited

U.S. PATENT DOCUMENTS

| | | |
|---|---|---|
| 11,221,222 B2 | 1/2022 | Booij |
| 11,585,663 B2 | 2/2023 | Booij |

FOREIGN PATENT DOCUMENTS

| | | |
|---|---|---|
| EP | 2 472 227 A2 | 7/2012 |
| WO | WO 2017/078181 A2 | 5/2017 |

OTHER PUBLICATIONS

International Search Report dated Dec. 2, 2020 for Appl. No. PCT/IB2020/059174, 4 pages.
Written Opinion dated Dec. 2, 2020 for Appl. No. PCT/IB2020/059174, 7 pages.
S. Holm, "Ultrasound positioning based on time-of-flight and signal strength," 2012 IEEE International Conference on Indoor Positioning and Indoor Navigation (IPIN), Sydney, NSW, Nov. 13, 2012, pp. 1-6.
Nissanka B. Priyantha, et al., "The Cricket Location-Support System," Proceedings of the Sixth Annual ACM/IEEE International Conference on Mobile Computing and Networking (MobiCom '00), Aug. 6-11, 2000, Assoc. for Computer Machinery, pp. 32-43.
C. Fischer and H. Gellersen, "Location and Navigation Support for Emergency Responders: A Survey," IEEE Pervasive Computing, vol. 9, No. 1, Jan.-Mar. 2010, pp. 38-47.

*Primary Examiner* — Nabil H Syed
(74) *Attorney, Agent, or Firm* — Sterne, Kessler, Goldstein & Fox P.L.L.C.

(57) ABSTRACT

A method for finding door location in an automated way based on observations of people that are equipped with a device whose position is determined acoustically. By observing positioning transitions across internal structures such as walls, the location of doors can be automatically identified.

20 Claims, 4 Drawing Sheets

AUTOMATIC EGRESS/INGRESS DETECTION IN AN ACOUSTIC POSITIONING SYSTEM

CROSS-REFERENCE TO RELATED APPLICATION

This application is a continuation of U.S. Non-provisional patent application Ser. No. 17/572,857, titled "Automatic Egress/Ingress Detection in an Acoustic Positioning System," which was filed on Jan. 11, 2022, which is a continuation of U.S. Non-provisional patent application Ser. No. 16/587,577, titled "Automatic Egress/Ingress Detection in an Acoustic Positioning System," which was filed on Sep. 30, 2019, all of which are incorporated herein by reference in their entirety.

FIELD

The present disclosure relates generally to real-time locating systems and more particularly to real-time locating systems for use in building modeling.

BACKGROUND

Indoor spaces are designed to meet various requirements such as adequate light, proper air circulation, and adequate space for the various purposes to which the indoor space is put. These requirements result in specific constraints on the shape, size, location, and orientation of navigational sections such as doors, walls, and corridors. Such navigational sections are typically represented by a floor plan. Floor plans may be used for proper utilization, for energy optimization, for safety planning, and for generation of a building information model (BIM).

In indoor positioning systems, there is a strong requirement to obtain accurate maps of the interior of building. Doors are important landmarks in a building because they provide the entrance and exit points of rooms, and because they provide meaningful structures for navigation applications. However, the location of doors requires considerable effort to represent in building information models. Thus, in practice, such maps of interior spaces often lack detail, are out-of-date, or are inaccurate, particularly with respect to the location of doors. The accurate knowledge of the existence and location of doors and passageways is particularly important in generating routing information for navigation solutions. What is desired is a solution that can obtain accurate existence and location of doors and passageways.

SUMMARY

In an embodiment of the present disclosure, a method of door location in an indoor environment comprises locating, by an acoustic location system, a location tag at a first location in a first region within the indoor environment. The method further includes locating at a later time, by the acoustic location system, the location tag at a second location in a second region within the indoor environment, wherein the first region is separated from the second region by a partition. Finally, the method includes determining a presence of a door located in the partition.

BRIEF DESCRIPTION OF THE DRAWINGS

The accompanying drawings, which are incorporated herein and form a part of the specification, illustrate embodiments of the present disclosure and, together with the description, further explain the principles of the disclosure and enable a person skilled in the pertinent arts to make and use the embodiments.

Figure 1:
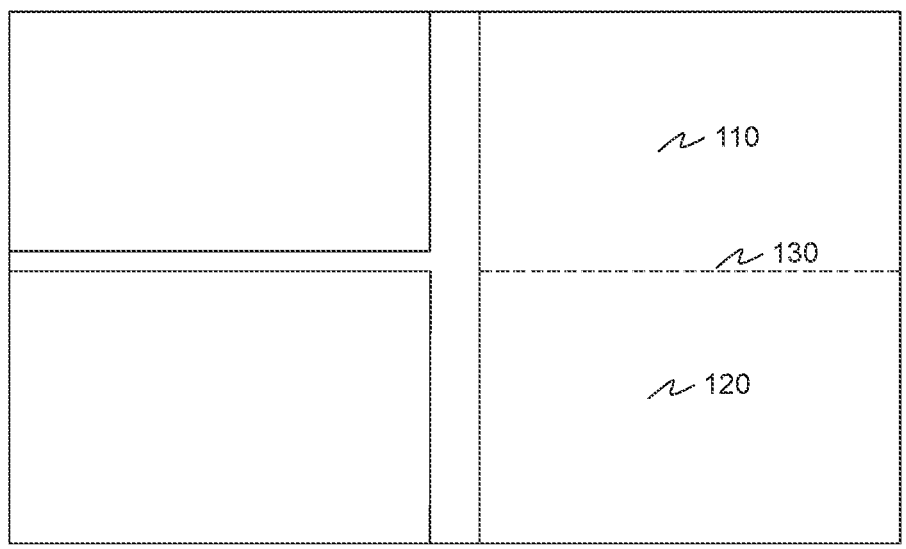
FIG. 1 illustrates a floor plan with two regions separated by a partition, according to an example embodiment of the present disclosure.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION

The present disclosure will be described with reference to the accompanying drawings. In the drawings, like reference numbers indicate identical or functionally similar elements. Additionally, the left-most digit of a reference number identifies the drawing in which the reference number first appears.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment does not necessarily include the particular feature, structure, or characteristic. Moreover, such phrases do not necessarily refer to the same exemplary embodiment. Further, when the disclosure describes a particular feature, structure, or characteristic in connection with an exemplary embodiment, those skilled in the relevant arts will know how to affect such feature, structure, or characteristic in connection with other exemplary embodiments, whether or not explicitly described.

The exemplary embodiments described herein provide illustrative examples and are not limiting. Other exemplary embodiments are possible, and modifications may be made to the exemplary embodiments within the spirit and scope of the disclosure. Therefore, the Detailed Description does not limit the disclosure. Rather, only the below claims and their equivalents define the scope of the disclosure.

Hardware (e.g., circuits), firmware, software, or any combination thereof may be used to achieve the embodiments. Embodiments may also be implemented as instructions stored on a machine-readable medium and read and executed by one or more processors. A machine-readable medium includes any mechanism for storing or transmitting information in a form readable by a machine (e.g., a computing device). For example, in some embodiments a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that the actions result from computing devices, processors, controllers, or other devices executing the firmware, software, routines, and/or instructions.

Any reference to the term "module" shall be understood to include at least one of software, firmware, and hardware (such as one or more circuit, microchip, or device, or any combination thereof), and any combination thereof. In addition, those skilled in relevant arts will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will fully reveal the general nature of the disclosure so that others can, by applying knowledge of those skilled in relevant arts, readily modify and/or customize for various applications such exemplary embodiments, without undue experimentation and without departing from the spirit and scope of the disclosure. Therefore, such modifications fall within the meaning and plurality of equivalents of the exemplary embodiments based upon the teaching and guidance presented herein. Here, the phraseology or terminology serves the purpose of description, not limitation, such that the terminology or phraseology of the present specification should be interpreted by those skilled in relevant arts in light of the teachings herein.

As noted above, there is a need to obtain accurate maps of the interior of building, and in particular an accurate knowledge of the existence and location of doors and passageways. An approach is described below for finding door locations in an automated way based on the observations of people that are equipped with a device that is being positioned acoustically. Beginning with a building information model (BIM), walls may be identified, either by reading a structured BIM model, by tracing flat floor maps, or by using surveying.

Following the identification of the walls, doors may be identified automatically using the following methodology based on acoustic positioning systems. The BIM model contains information on the internal structures such as walls and windows but lacks, either fully or partially, the location of doors. Acoustic positioning systems provide accurate positioning information of objects such as location tags, mobile phones or smart watches. The use of the term "location tags" in this context means a transponder that is receptive to a real-time location system in order to provide location information. By observing positioning transitions across such internal structures that are statistically significant, the location of doors can be automatically identified. Acoustic positioning systems offer a number of options for doing so, including the use of low resolution positioning and the use of high resolution position.

Low Resolution Positioning

The location of doors may be identified using a low resolution acoustic positioning system. The positioning information of objects such as location tags, mobile phones or smart watches is monitored and tracked. Where zone transitions occur consistently between two locations that are marked as being separated by internal partitions such as walls or windows, such transitions provide indications of the location of doors.

Optionally, additional checks may be used to establish the existence and location of a door. One additional check involves an examination of the acoustic links between the acoustic beacon transceivers used to identify the two locations that define the transition that is indicative of a door. By examining a time-of-flight-based range or the root sum squared (RSS) of the acoustic signals, an abrupt change would be consistent with the existence of a transition, i.e., a door.

While the existence of a doorway between two locations can be used for routing purposes, this approach may not be able to determine the exact position of the door.

High Resolution Positioning

In this context, high resolution positioning is considered to be two-dimensional or three-dimensional positioning with centimeter-level accuracy. If one or both locations have accurate and high resolution positioning capabilities, the ability to identify doors is further enhanced. With high resolution positioning capabilities, wall transitions can now be identified by inspecting the velocity vector of the transition event in those locations that offer such high accuracy and high dimensional resolution. The velocity vector may be derived by derivation from successive positioning events that are near in time (e.g. sub-second update rate) or may be derived from Doppler range measurements. By calculating the magnitude of inner product of the normal vector of the structure (e.g., wall) and the Doppler velocity vector, one may obtain a strong quality parametric indication of whether the transition is a measurement error or a door passage event. For example, if the magnitude of the inner product is greater than 0.15 m/s, such an value would be a strong indication that the transition is indicative of a door. The threshold of 0.15 m/s is representative of a value that separates noise from an indication of an egress/ingress.

Furthermore, by using statistical techniques, the determination of the location of a door may be further strengthened. By analyzing the various positions of a prospective transition over a large number of transition events, the location of the potential transition may be analyzed statistically to provide, for example, a mean and position vector error (or standard deviation). The size of the position vector error provides a statistical significance of the transition.

FIG. 1 illustrates an indoor space 100 which includes a first region 110 and a second region 120 separated by a partition 130. Partition 130 may be a wall or a window, or other tangible separation between two regions. In an exemplary embodiment, a building information model for Indoor space 100 may be available, but limited in information. In particular, the building information model may not indicate if there is a door between first region 110 and second region 120.

Figure 2:
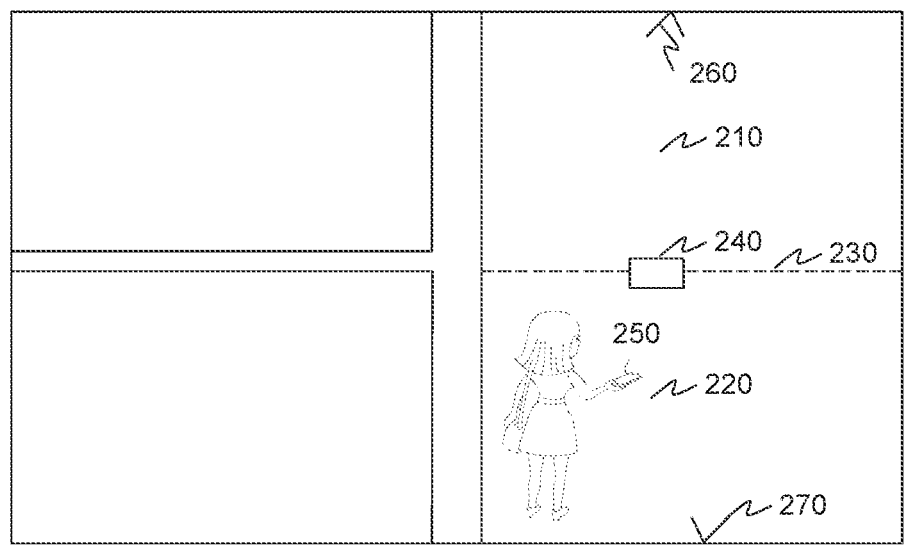
FIG. 2 illustrates a real-time acoustic location system operating to provide position information, according to example embodiments of the present disclosure.

FIG. 2 illustrates an indoor space 200 which includes a first region 210 and a second region 220 separated by a partition 230. Partition 230 may be a wall or a window. In indoor space 200, there is a real-time location system with acoustic beacon transceivers 260, 270, with acoustic beacon transceiver 260 located in first region 210 and acoustic beacon transceiver 270 located in second region 220. The real-time location system is able to provide real-time location information for location tag 250. Based on tracking location tag 250, door 240 may be identified as being located in partition 230.

Once doorways have been identified using the methods outlined above, one may use the now known locations of doorways to derive location changes from an area with high resolution coverage, to areas without any coverage using a similar principle of magnitude of the inner product of the velocity vector and the normal of the door This effectively allows one to detect changes from common areas and corridors to adjacent rooms (and vice versa), without requiring the equipment to be installed in these rooms thereby greatly reducing the installation complexity and cost. In this embodiment, it is noted that the acoustic signals propagate from the areas where there is high resolution coverage approximate two to three meters into the areas that does not have any coverage. The two to three meters is a typical distance, with the distance being somewhat dependent on signal frequency and door size opening. In this situation, the velocity vector approach described above continues to work. When the location tag moves into the region lacking coverage, the positioning error will increase and eventually exceed a predetermined threshold of location accuracy. In an illustrative embodiment, the predetermined threshold of location accuracy may be one to two meters. In other embodiments, the predetermined threshold of location accuracy may be expressed in relative terms, such as number of standard deviations. When the acoustic location system determines that the positioning error of the location of the location tag exceeds the predetermined threshold, then it may be concluded that the location tag is now in an adjacent area.

Figure 3:
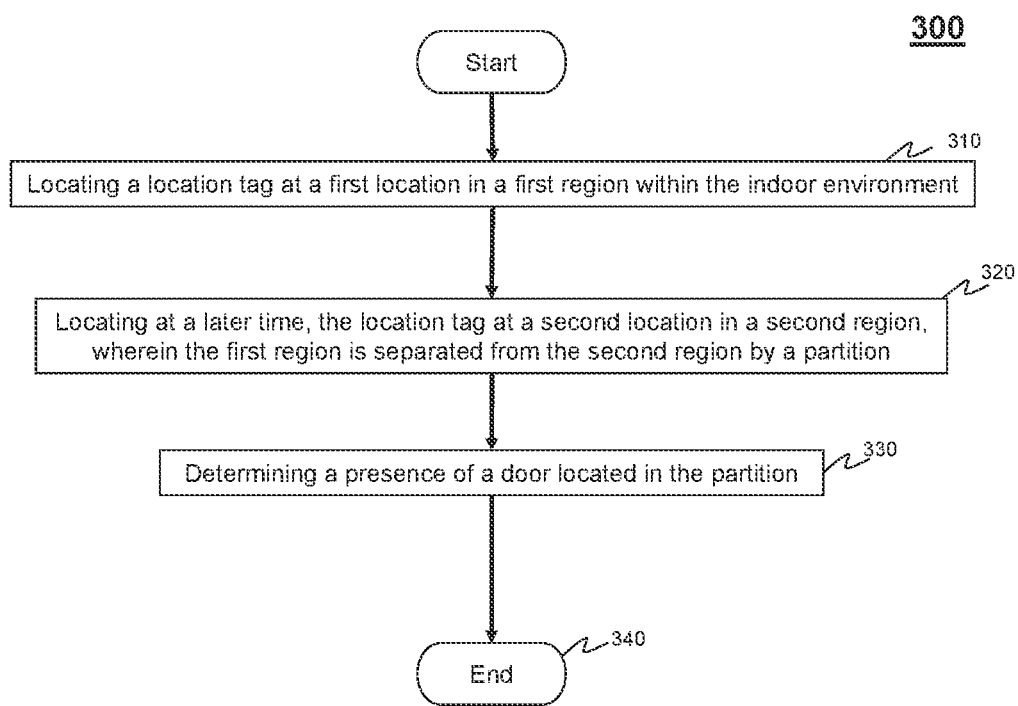
FIG. 3 illustrates a method for door location in an indoor environment, according to example embodiments of the present disclosure.

FIG. 3 illustrates the above exemplary method 300 for door location in an indoor environment. Method 300 begins at step 310. In step 310, a location tag is located, by an acoustic location system, at a first location in a first region within the indoor environment.

In step 320, the location tag is located at a later time, by the acoustic location system, at a second location in a second region within the indoor environment, where the first region is separated from the second region by a partition.

In step 330, the presence of a door located in the partition is determined.

Method 300 ends at step 340.

Figure 4:
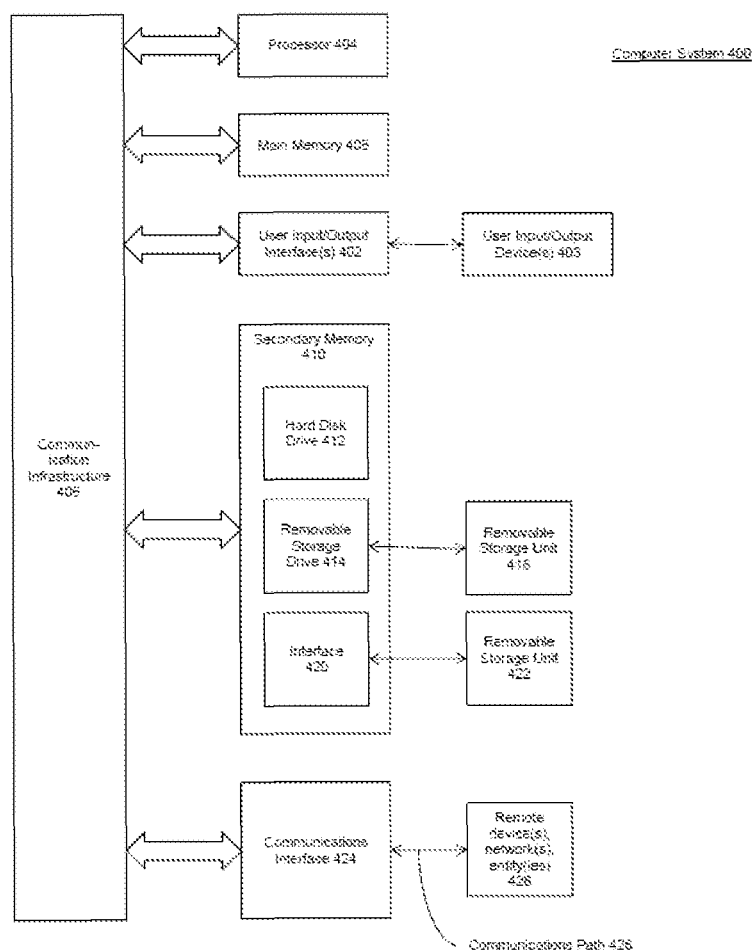
FIG. 4 depicts an exemplary computer system, according to embodiments of the present disclosure.

Various embodiments can be implemented, for example, using one or more computer systems, such as computer system 400 shown in FIG. 4. Computer system 400 can be used, for example, to implement the systems and processes described in FIGS. 1-3. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of egress/ingress location in an indoor environment comprising:
    locating, by an acoustic location system, a location tag at a first location in a first region within the indoor environment, wherein the acoustic location system is a real-time location system comprising acoustic beacon transceivers, and wherein the location tag is a transponder that is receptive to the real-time location system in order to provide location information;
    locating at a later time, by the acoustic location system, the location tag at a second location in a second region within the indoor environment, wherein the first region is separated from the second region by a partition;
    determining a velocity vector of the location tag, wherein the determining the velocity vector includes using successive position events that are near-in-time or using derivations from Doppler range measurements; and
    determining a presence of an egress/ingress located in the partition, the determining based on a magnitude of an inner product of the velocity vector with a normal vector of the partition exceeding a predetermined threshold.

2. The method of claim 1, further comprising:
    determining an abrupt change of a property of an acoustic signal in locating the location tag at the first location and at the second location; and
    confirming the presence of the egress/ingress based on the determining of the abrupt change.

3. The method of claim 2, wherein the property is one of time-of-flight-based range or a root sum square (RSS) level.

4. The method of claim 1, wherein the acoustic location system includes a first acoustic beacon transceiver located in the first region and a second acoustic beacon transceiver located in the second region.

5. The method of claim 1, wherein the predetermined threshold is 0.15 meters/second.

6. A method of egress/ingress location in an indoor environment comprising:
    locating, by an acoustic location system, a location tag at a first location in a first region within the indoor environment, wherein the acoustic location system is a real-time location system comprising acoustic beacon transceivers, and wherein the location tag is a transponder that is receptive to the real-time location system in order to provide location information;
    receiving data showing a partition associated with the first region;
    determining a velocity vector of the location tag in a vicinity of the partition, wherein the determining the velocity vector includes using successive position events that are near-in-time or using derivations from Doppler range measurements; and
    determining a presence of an egress/ingress located in the partition based on a magnitude of an inner product of the velocity vector with a normal vector of the partition exceeding a predetermined threshold.

7. The method of claim 6, wherein the predetermined threshold is 0.15 meters/second.

8. The method of claim 6, wherein the determining the presence of the egress/ingress further includes determining a location error of the location tag exceeds another predetermined threshold.

9. A computer-implemented method of egress/ingress location in an indoor environment, the computer-implemented method comprising:
    locating, by an acoustic location system, a location tag at a first location in a first region within the indoor environment, wherein the acoustic location system is a real-time location system comprising acoustic beacon transceivers, and wherein the location tag is a transponder that is receptive to the real-time location system in order to provide location information;
    locating at a later time, by the acoustic location system, the location tag at a second location in a second region within the indoor environment, wherein the first region is separated from the second region by a partition;
    determining a velocity vector of the location tag, wherein the determining the velocity vector includes using successive position events that are near-in-time or using derivations from Doppler range measurements; and
    determining a presence of an egress/ingress located in the partition, the determining based on a magnitude of an inner product of the velocity vector with a normal vector of the partition exceeding a predetermined threshold.

10. The computer-implemented method of claim 9, further comprising:
    determining an abrupt change of a property of an acoustic signal in locating the location tag at the first location and at the second location; and
    confirming the presence of the egress/ingress based on the determining of the abrupt change.

11. The computer-implemented method of claim 10, wherein the property is one of time-of-flight-based range or a root sum square (RSS) level.

12. The computer-implemented method of claim 9, wherein the acoustic location system includes a first acoustic beacon transceiver located in the first region and a second acoustic beacon transceiver located in the second region.

13. The computer-implemented method of claim 9, wherein the predetermined threshold is 0.15 meters/second.

14. A computer-implemented method of egress/ingress location in an indoor environment, the computer-implemented method comprising:
    locating, by an acoustic location system, a location tag at a first location in a first region within the indoor environment, wherein the acoustic location system is a real-time location system comprising acoustic beacon transceivers, and wherein the location tag is a transponder that is receptive to the real-time location system in order to provide location information;

receiving data showing with a partition associated with the first region;

determining a velocity vector of the location tag in a vicinity of the partition, wherein the determining the velocity vector includes using successive position events that are near-in-time or using derivations from Doppler range measurements; and determining a presence of an egress/ingress located in the partition based on a magnitude of an inner product of the velocity vector with a normal vector of the partition exceeding a predetermined threshold.

15. The computer-implemented method of claim 14, wherein the predetermined threshold is 0.15 meters/second.

16. The computer-implemented method of claim 14, wherein the determining the presence of the egress/ingress further includes determining a location error of the location tag exceeds another predetermined threshold.

17. The method of claim 6, wherein the acoustic location system includes a first acoustic beacon transceiver located in the first region and a second acoustic beacon transceiver located in the second region.

18. The method of claim 6, further comprising:

repeating the determining a velocity vector and the determining a presence of an egress/ingress located in the partition over a number of transition events from the first region to the second region; and analyzing statistically data from the repeating to yield a location of the door.

19. The computer-implemented method of claim 14, wherein the acoustic location system includes a first acoustic beacon transceiver located in the first region and a second acoustic beacon transceiver located in the second region.

20. The computer-implemented method of claim 14, further comprising:

repeating the determining a velocity vector and the determining a presence of an egreee/ingress located in the partition over a number of transition events from the first region to the second region; and analyzing statistically data from the repeating to yield a location of the egress/ingress.

\* \* \* \* \*

UNITED STATES PATENT AND TRADEMARK OFFICE
CERTIFICATE OF CORRECTION

PATENT NO. : 12,038,287 B2
APPLICATION NO. : 18/111031
DATED : July 16, 2024
INVENTOR(S) : Booij It is certified that error appears in the above-identified patent and that said Letters Patent is hereby corrected as shown below:

In the Claims

In Column 10, Claim 18, Line 7, delete "door" and replace with --egress/ingress--.

In Column 10, Claim 20, Line 16, delete "egreee/ingress" and replace with --egress/ingress--.

Signed and Sealed this
Seventeenth Day of September, 2024

Katherine Kelly Vidal
*Director of the United States Patent and Trademark Office*